US012626606B2

(12) United States Patent
Ma et al.

(10) Patent No.: US 12,626,606 B2
(45) Date of Patent: May 12, 2026

(54) WATER-AIR INTEGRATED SEARCH AND RESCUE SYSTEM AND METHOD

(71) Applicant: WUHAN UNIVERSITY OF TECHNOLOGY, Wuhan (CN)

(72) Inventors: Yong Ma, Wuhan (CN); Haiyang Jiang, Wuhan (CN); Hao Li, Wuhan (CN); Jing Wang, Wuhan (CN); Yujiao Zhao, Wuhan (CN); Fengkai Luan, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 211 days.

(21) Appl. No.: 18/344,846

(22) Filed: Jun. 29, 2023

(65) Prior Publication Data

US 2024/0169848 A1 May 23, 2024

Related U.S. Application Data

(63) Continuation of application No. PCT/CN2021/117161, filed on Sep. 8, 2021.

(30) Foreign Application Priority Data

Dec. 29, 2020 (CN) ......................... 202011603766.0

(51) Int. Cl.
*G08G 5/55* (2025.01)
*G08G 5/57* (2025.01)
*G08G 5/80* (2025.01)

(52) U.S. Cl.
CPC ................. *G08G 5/55* (2025.01); *G08G 5/57* (2025.01); *G08G 5/80* (2025.01)

(58) Field of Classification Search
CPC ... B63C 9/01; B63C 9/02; G08G 5/55; G08G 5/57; G08G 5/80; Y02A 90/30
See application file for complete search history.

(56) References Cited

U.S. PATENT DOCUMENTS 7,916,074 B2 3/2011 Mathews et al.
9,944,366 B2 * 4/2018 Tang ......................... B63C 9/01
(Continued)

FOREIGN PATENT DOCUMENTS

CN 109358653 A 2/2019
CN 110422302 A 11/2019
(Continued)

OTHER PUBLICATIONS

Internation Search Report of PCT/CN2021/117161, Mailed Oct. 28, 2021.

*Primary Examiner* — Abby J Flynn
*Assistant Examiner* — Paulo Roberto Gonzalez Leite

(57) ABSTRACT

A water-air integrated search and rescue system includes a flight power module, a navigation power module, a plurality of biomimetic unmanned boats, a drone, and an integrated control module. The integrated control module is configured to acquire weather information and determine whether to send a flight signal to the flight power module or to send a navigation signal to the navigation power module based on the weather information; the flight power module is configured to fly the drone to a search and rescue region after receiving the flight signal; the navigation power module is configured to navigate the drone to the search and rescue region after receiving the navigation signal; the integrated control module is further configured to control the drone to deploy the plurality of biomimetic unmanned boats; and the plurality of biomimetic unmanned boats are configured to carry out search and rescue work in the search and rescue region.

4 Claims, 4 Drawing Sheets

(56) References Cited

U.S. PATENT DOCUMENTS

| | | | | |
|---|---|---|---|---|
| 11,033,705 | B2 | 6/2021 | Zapol et al. | |
| 11,208,186 | B2 | 12/2021 | Yu et al. | |
| 2006/0214841 | A1 * | 9/2006 | Li | G01S 13/76 342/118 |
| 2016/0003943 | A1 * | 1/2016 | Nakano | G01S 15/87 701/301 |
| 2018/0157255 | A1 * | 6/2018 | Halverson | G07C 5/0816 |
| 2019/0046816 | A1 * | 2/2019 | Browning | A62B 1/00 |
| 2020/0031438 | A1 * | 1/2020 | Moses | G01S 5/0231 |
| 2020/0043348 | A1 * | 2/2020 | Ghosh | G05D 1/101 |
| 2020/0079505 | A1 * | 3/2020 | Stepura | B64F 1/0297 |
| 2020/0230805 | A1 * | 7/2020 | Murali | B25J 9/009 |
| 2023/0257086 | A1 * | 8/2023 | Ferreira Noras | B64U 10/00 701/2 |

FOREIGN PATENT DOCUMENTS

| | | | |
|---|---|---|---|
| CN | 110481777 | A | 11/2019 |
| CN | 112606973 | A | 4/2021 |

* cited by examiner

WATER-AIR INTEGRATED SEARCH AND RESCUE SYSTEM AND METHOD

CROSS-REFERENCE TO RELATED APPLICATIONS

This application is a continuation of International Patent Application No. PCT/CN2021/117161 with a filing date of Sep. 8, 2021, designating the United States, now pending, and further claims priority to Chinese Patent Application No. 202011603766.0 with a filing date of Dec. 29, 2020. The content of the aforementioned applications, including any intervening amendments thereto, are incorporated herein by reference.

TECHNICAL FIELD

The present disclosure relates to the technical field of unmanned aerial vehicles (UAVs) and unmanned ships for search and rescue, and in particular to a water-air integrated search and rescue system and method.

BACKGROUND

With the rapid growth of domestic and international shipping business, various natural and man-made maritime risks occur frequently, and the probability of maritime accidents increases significantly. The maritime accidents include capsizing, collision, striking a rock, and stranding that ships encounter during navigation due to harsh sea conditions such as strong winds and fog, as well as ship sinking caused by explosions or fires. Therefore, water rescue is particularly important. The water rescue includes maritime rescue, flood rescue, etc., which covers emergency rescue command, detection, information acquisition, material supply, rescue planning, rescue methods, etc.

At present, China has made certain progress in the technical aspect of maritime search and rescue work. However, the maritime search and rescue system is not yet mature and cannot be perfectly integrated with existing search and rescue technologies. In comparison, although the application of air and land search and rescue systems has certain limitations, they have undergone significant development. Therefore, the low efficiency of existing maritime search and rescue is an urgent problem that needs to be solved.

SUMMARY OF PRESENT INVENTION

In order to solve the problem of low efficiency in maritime search and rescue in the prior art, the present disclosure provides a water-air integrated search and rescue system and method.

The water-air integrated search and rescue system includes a flight power module, a navigation power module, a plurality of biomimetic unmanned boats, a drone, and an integrated control module; the integrated control module is configured to acquire weather information and determine whether to send a flight signal to the flight power module or to send a navigation signal to the navigation power module based on the weather information; the flight power module is configured to fly the drone to a search and rescue region after receiving the flight signal; the navigation power module is configured to navigate the drone to the search and rescue region after receiving the navigation signal; the integrated control module is further configured to control the drone to deploy the plurality of biomimetic unmanned boats when the drone is flied or navigated to the search and rescue region; the drone is configured to be flied or navigated to the search and rescue region and to deploy the plurality of biomimetic unmanned boats; and the plurality of biomimetic unmanned boats is configured to carry out search and rescue work in the search and rescue region.

In one embodiment, the integrated control module includes a fleet positioning unit configured to acquire position information of the plurality of biomimetic unmanned boats and transmit the position information to a user end.

In one embodiment, the fleet positioning unit is specifically configured to generate a short energy pulse sequence, extend the short energy pulse sequence to a frequency range through orthogonal frequency division modulation or direct sorting to acquire an extended short energy pulse sequence, measure a time difference of radio signals arriving at the plurality of biomimetic unmanned boats from different base stations through the extended short energy pulse sequence, and acquire the position information of the plurality of biomimetic unmanned boats.

In one embodiment, the integrated control module further includes a collision avoidance unit and an alarm unit; the collision avoidance unit is configured to determine a distance between the plurality of biomimetic unmanned boats and an obstacle, and send an alarm signal to the alarm unit if the distance is less than a set threshold; and the alarm unit is configured to alarm upon receiving the alarm signal.

In one embodiment, the collision avoidance unit includes an ultrasonic sensor and a microcontroller; the collision avoidance unit is specifically configured to emit a high level through a control port of the ultrasonic sensor, start a first timing when there is an output to a receiving port of the ultrasonic sensor, start a second timing when the output to the receiving port of the ultrasonic sensor becomes a low level, acquire a ranging time based on a time difference between the first timing and the second timing, and send the ranging time to the microcontroller; and the microcontroller is configured to calculate the distance, determine whether the distance is less than the set threshold, and send the alarm signal to the alarm unit if the distance is less than the set threshold.

In one embodiment, the integrated control module further includes an underwater image acquisition unit and a water surface image acquisition unit; and the underwater image acquisition unit and the water surface image acquisition unit are respectively configured to acquire underwater image information and water surface image information.

In one embodiment, the integrated control module is specifically configured to control the drone to deploy the plurality of biomimetic unmanned boats at different locations within the search and rescue region when the drone is flied or navigated to the search and rescue region.

In one embodiment, the plurality of biomimetic unmanned boats is configured to carry out the search and rescue work in the search and rescue region; specifically, the biomimetic unmanned boat is configured to carry out the search and rescue work in the search and rescue region; if the biomimetic unmanned boat finds a person to be rescued, the biomimetic unmanned boat sends positioning information to the drone and is converted into an airbag; and the drone approaches the biomimetic unmanned boat to carry out rescue.

The water-air integrated search and rescue method includes the following steps:

acquiring weather information, and determining whether to send a flight signal to a flight power module or to send a navigation signal to a navigation power module based on the weather information; controlling, by the flight power module, a drone to fly to a search and rescue region when the flight power module receives the flight signal; controlling, by the navigation power module, the drone to navigate to the search and rescue region when the navigation power module receives the navigation signal; controlling, when the drone is flied or navigated to the search and rescue region, the drone to deploy a plurality of biomimetic unmanned boats; and controlling the plurality of biomimetic unmanned boats to carry out search and rescue work in the search and rescue region.

In one embodiment, the water-air integrated search and rescue method includes: controlling, if the plurality of biomimetic unmanned boats finds a person to be rescued, the plurality of biomimetic unmanned boats to send positioning information to the drone; controlling the plurality of biomimetic unmanned boats to be converted into an airbag; and controlling the drone to approach the plurality of biomimetic unmanned boats to carry out rescue.

Compared with the prior art, the present disclosure has the following beneficial effects. The present disclosure provides a water-air integrated search and rescue system and method. The integrated control module is configured to acquire weather information and determine whether to send a flight signal to the flight power module or to send a navigation signal to the navigation power module based on the weather information. The flight power module is configured to fly the drone to a search and rescue region after receiving the flight signal. The navigation power module is configured to navigate the drone to the search and rescue region after receiving the navigation signal. The integrated control module is further configured to control the drone to deploy the plurality of biomimetic unmanned boats when the drone is flied or navigated to the search and rescue region. The drone is configured to be flied or navigated to the search and rescue region and to deploy the plurality of biomimetic unmanned boats. The plurality of biomimetic unmanned boats is configured to carry out search and rescue work in the search and rescue region. In this way, the present disclosure significantly improves the efficiency of maritime search and rescue.

DETAILED DESCRIPTION OF THE EMBODIMENTS

Preferred examples of the present disclosure will be described in detail below with reference to the drawings. The drawings constitute a part of the present disclosure, and are used together with the examples of the present disclosure to explain the principles of the present disclosure rather than limit a scope of the present disclosure.

Embodiment 1

Figure 1:
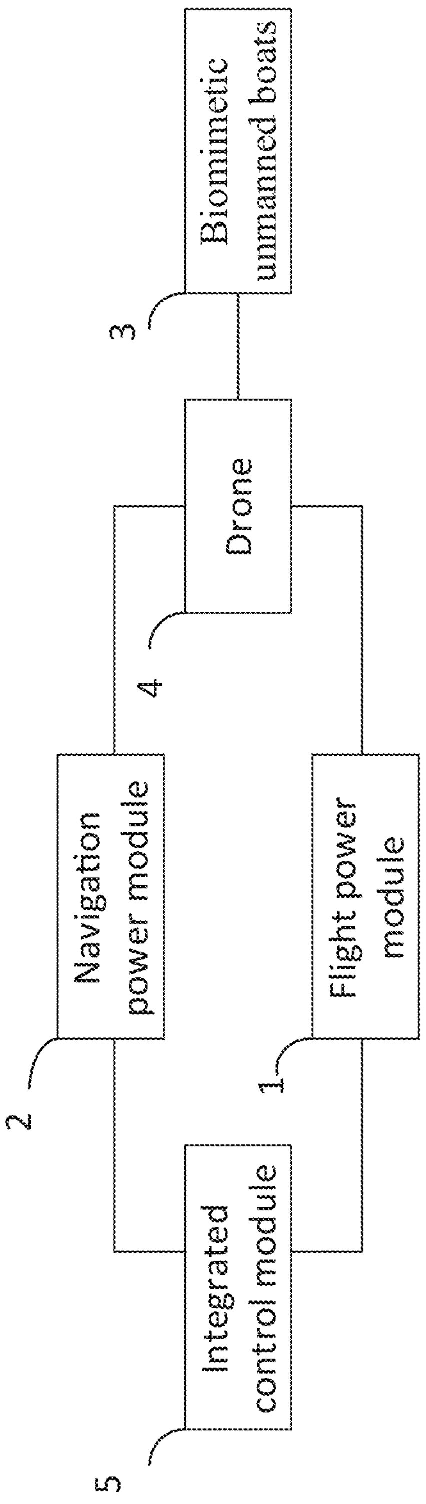
FIG. 1 is a block diagram showing a water-air integrated search and rescue system according to the present disclosure.

The embodiment of the present disclosure provides a water-air integrated search and rescue system. As shown in FIG. 1, the system includes a flight power module 1, a navigation power module 2, a plurality of biomimetic unmanned boats 3, a drone 4, an integrated control module 5.

The integrated control module 5 is configured to acquire weather information and determine whether to send a flight signal to the flight power module 1 or to send a navigation signal to the navigation power module 2 based on the weather information. The flight power module 1 is configured to fly the drone 4 to a search and rescue region after receiving the flight signal. The navigation power module 2 is configured to navigate the drone 4 to the search and rescue region after receiving the navigation signal. The integrated control module 5 is further configured to control the drone 4 to deploy the plurality of biomimetic unmanned boats 3 when the drone 4 is flied or navigated to the search and rescue region. The drone 4 is configured to be flied or navigated to the search and rescue region and to deploy the plurality of biomimetic unmanned boats 3. The plurality of biomimetic unmanned boats 3 is configured to carry out search and rescue work in the search and rescue region.

In a specific embodiment, the integrated control module activates the drone and selects the movement mode of the drone based on the weather conditions. In harsh weather with high winds and strong waves, the drone is quickly flied to the search and rescue region. In normal weather, the drone is quickly navigated to the search and rescue region. After reaching the search and rescue region, the drone is raised to deploy the plurality of biomimetic unmanned boats for the search and rescue work.

Figure 2:
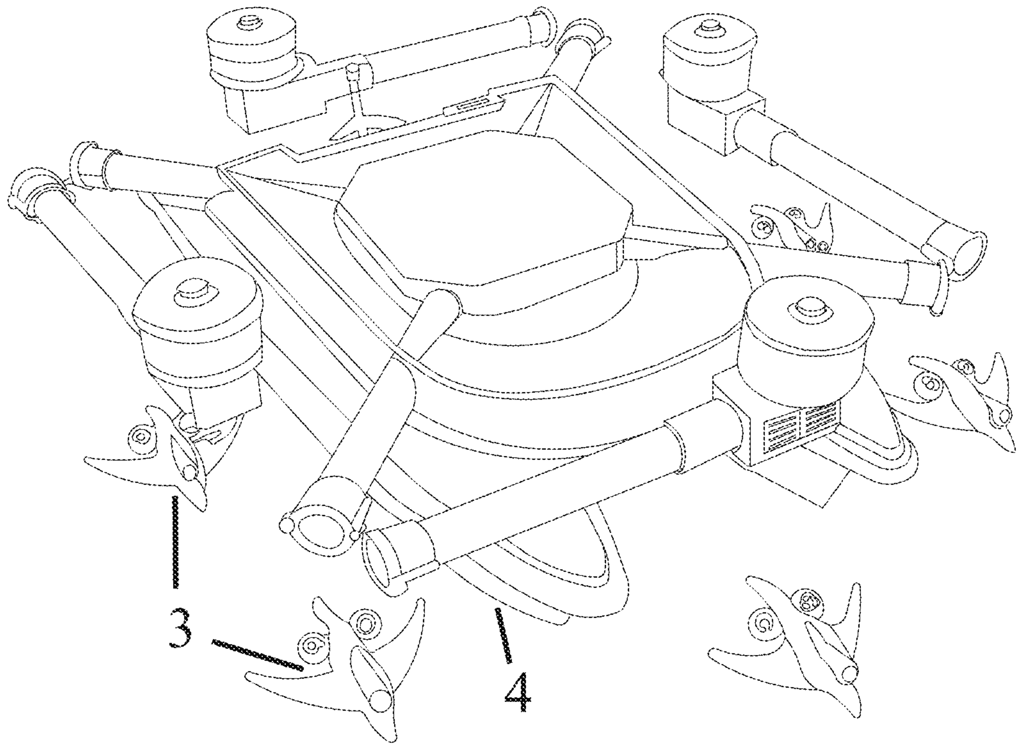
FIG. 2 is a schematic diagram showing an drone according to the present disclosure.

In a specific implementation, the drone is designed as a dual-body dual-track wave-breaking integrated drone. FIG. 2 shows a model diagram of the drone. As shown in FIG. 2, the drone includes a drone body and the plurality of biomimetic unmanned boats including a plurality of biomimetic unmanned boats. The drone controls an integrated power module including the flight power module and the navigation power module via pulse width modulation (PWM) dual-signal communication. The drone is provided with an infrared obstacle avoidance module in front to improve safety. The drone is provided with a storage compartment for storing the plurality of biomimetic unmanned boats and a storage box. The storage box is configured to store first-aid items. A quad-rotor part of the drone is made of an aluminum alloy material, which has the advantages of easy processing, high durability, and lightweight. While lightweight acrylonitrile-butadiene-styrene (ABS) provides great buoyancy, the weight of the drone is reasonable. Therefore, the drone also has desired wind resistance in addition to the great buoyancy, ensuring that the drone can truly achieve integrated power switching operations under various special circumstances when.

The quad-rotor part of the drone adopts a stable "X" shaped structure, changing the folding method of the rotors. An alloy joint is provided in a central part of the rotor, dividing a complete rotor crossbeam into two, ultimately forming a "swastika" shaped folding structure. When the drone is working, the weight of the four rotors folded is distributed in four directions of the drone, effectively avoiding rollover. A flight control holder bracket is customized with an aluminum alloy, which effectively reduces the weight to facilitate navigation and stability, and is consistent with rectangular drone body design. The drone body is designed as a rectangular hollow double-body. A microcontroller part for drone body control is located at a rear part of the drone body, allowing the central accommodation compartment to carry the plurality of biomimetic unmanned boats while increasing the buoyancy of the drone.

Preferably, the integrated control module includes a fleet positioning unit. The fleet positioning unit is configured to acquire position information of the plurality of biomimetic unmanned boats and transmit the position information to a user end.

Preferably, the fleet positioning unit is configured to acquire the position information of the plurality of biomimetic unmanned boats. Specifically, the fleet positioning unit is configured to generate a short energy pulse sequence, extend the short energy pulse sequence to a frequency range through orthogonal frequency division modulation or direct sorting to acquire an extended short energy pulse sequence, measure a time difference of radio signals arriving at the plurality of biomimetic unmanned boats from different base stations through the extended short energy pulse sequence, and acquire the position information of the plurality of biomimetic unmanned boats.

In a specific embodiment, the fleet positioning unit is configured to extend a pulse to a frequency range through orthogonal frequency division modulation or direct sorting based on the short energy pulse sequence, acquire an arrival time difference, measure a time difference of a positioning tag in radio signal propagation between two different positioning base stations through an ultra wideband, and acquire distance differences from the positioning tag to four groups of positioning base stations.

In a specific embodiment, base stations 1 and 2 form a first group, base stations 2 and 3 form a second group, base stations 3 and 4 form a third group, and base stations 4 and 1 form a fourth group.

Then:

$$d_{i,12}=r_{i,1}-r_{i,2}$$

$$d_{i,23}=r_{i,2}-r_{i,3}$$

$$d_{i,34}=r_{i,3}-r_{i,4}$$

$$d_{i,41}=r_{i,4}-r_{i,1}$$

where $d_{i,12}$ to $d_{i,41}$ denote the measured distance differences from the positioning label to the four groups of base stations, and $r_{i,1}$ to $r_{i,4}$ denote distances from a target i to the base stations 1 to 4.

$$d_{i,12}=\sqrt{(x_1-x_i)^2+(y_1-y_i)^2+(z_1-z_i)^2}-\sqrt{(x_2-x_i)^2+(y_2-y_i)^2+(z_2-z_i)^2}$$

$$d_{i,23}=\sqrt{(x_2-x_i)^2+(y_2-y_i)^2+(z_2-z_i)^2}-\sqrt{(x_3-x_i)^2+(y_3-y_i)^2+(z_3-z_i)^2}$$

$$d_{i,34}=\sqrt{(x_3-x_i)^2+(y_3-y_i)^2+(z_3-z_i)^2}-\sqrt{(x_4-x_i)^2+(y_4-y_i)^2+(z_2-z_i)^2}$$

$$d_{i,41}=\sqrt{(x_4-x_i)^2+(y_4-y_i)^2+(z_4-z_i)^2}-\sqrt{(x_1-x_i)^2+(y_1-y_i)^2+(z_1-z_i)^2}$$

where $(x_i, y_i, z_i)$ denotes coordinates of the target i; and $(x_1, y_1, z_1)$ to $(x_4, y_4, z_4)$ denote coordinates of the base stations 1 to 4, respectively. Any two equations mentioned above can be combined to acquire the specific coordinates of the positioning label. When there is only one base station, only distance measurement can be performed. When there are two base stations, two-dimensional coordinate measurement can be performed. When the number of the base stations is three or more, three-dimensional coordinate measurement can be performed, and a greater number of the base stations indicates a more accurate measurement result.

Preferably, the integrated control module further includes a collision avoidance unit and an alarm unit. The collision avoidance unit is configured to determine a distance between the plurality of biomimetic unmanned boats and an obstacle, and send an alarm signal to the alarm unit if the distance is less than a set threshold. The alarm unit is configured to alarm upon receiving the alarm signal.

Preferably, the collision avoidance unit includes an ultrasonic sensor and a microcontroller. The collision avoidance unit is configured to determine the distance between the plurality of biomimetic unmanned boats and the obstacle, and send the alarm signal to the alarm unit if the distance is less than a set threshold. Specifically, the collision avoidance unit is configured to emit a high level through a control port of the ultrasonic sensor, start a first timing when there is an output to a receiving port of the ultrasonic sensor, start a second timing when the output to the receiving port of the ultrasonic sensor becomes a low level, acquire a ranging time based on a time difference between the first timing and the second timing, and send the ranging time to the microcontroller. The microcontroller is configured to calculate the distance, determine whether the distance is less than the set threshold, and send the alarm signal to the alarm unit if the distance is less than the set threshold.

In a specific embodiment, the main components of the collision avoidance unit include an STC89C52/51 microcontroller, a Bluetooth serial port, an ultrasonic sensor, a PNP driver transistor, a DC5V active buzzer, an 11.0592 Mhz crystal oscillator, and a light-emitting diode (LED) power indicator light. The buzzer is provided with the PNP driver transistor.

Figure 3:
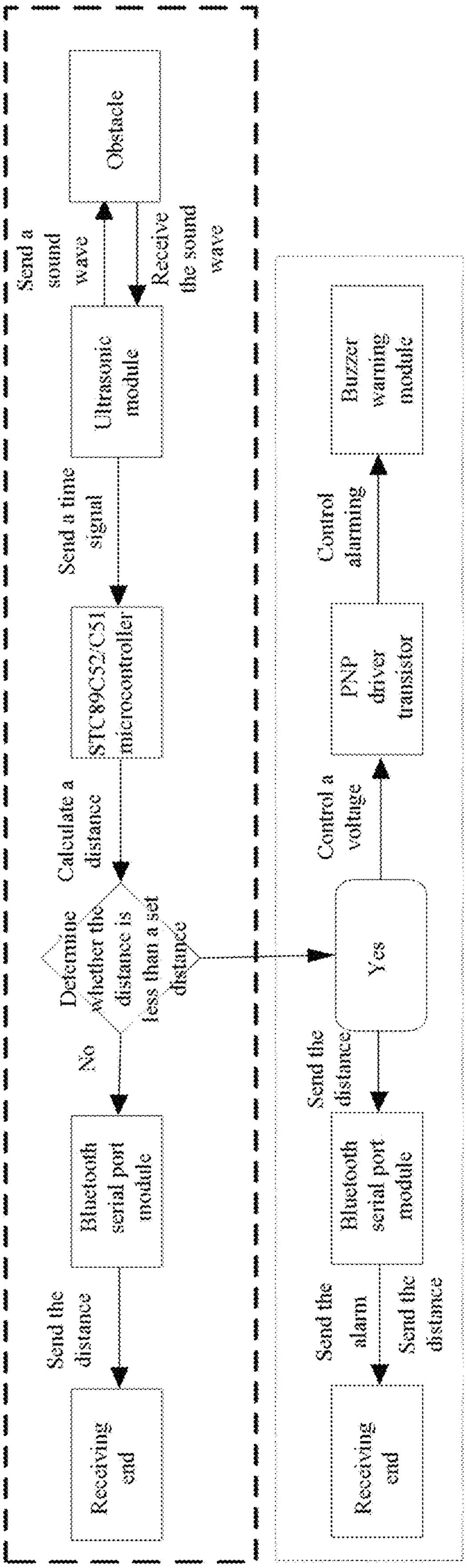
FIG. 3 is a flowchart showing an operation process of a collision avoidance unit according to the present disclosure.

In another specific embodiment, the flowchart of the collision avoidance unit is shown in FIG. 3. The collision avoidance unit is configured to emit a high level (10) u or more) through the control port of the ultrasonic sensor, wait for a high level at the receiving port of the ultrasonic sensor, starting a timing by a timer when there is an output to the receiving port, read a value of the timer as a ranging time when the output to the receiving port of the ultrasonic sensor becomes a low level, and transmit the ranging time to the microcontroller. The microcontroller is configured to calculate a distance (i.e. half of a product of the ranging time and a propagation speed of an ultrasound in the air), determine whether the distance is less than a set threshold, transmit only the calculated distance to the Bluetooth serial port if the distance is not less than the set threshold such that the distance is transmitted to a receiving end of the integrated control module through the Bluetooth serial port, and, if the distance is less than the set threshold, control the driver transistor to cause the buzzer to alarm, and transmit the distance and preset alarm information to the Bluetooth serial port such that the data is transmitted to the receiving end of the integrated control module through the Bluetooth serial port.

Preferably, the integrated control module further includes an underwater image acquisition unit and a water surface image acquisition unit. The underwater image acquisition unit and the water surface image acquisition unit are respectively configured to acquire underwater image information and water surface image information.

Preferably, the integrated control module controls the drone to deploy the plurality of biomimetic unmanned boats when the drone is flied or navigated to the search and rescue region. Specifically, the integrated control module is configured to control the drone to deploy the plurality of biomimetic unmanned boats at different locations within the search and rescue region when the drone is flied or navigated to the search and rescue region.

In a specific embodiment, the biomimetic unmanned boat is provided with a camera, sensor, and a main control chip. The biomimetic unmanned boat itself can perform position positioning, path planning, and information exchange with the drone. The main control chip is a Forever-12 chip that can achieve Bluetooth serial communication with a mobile phone. A stepper motor and a propeller connected thereto are controlled at a frequency of 2.4 GHZ to provide power for the biomimetic unmanned boat. A propeller-quad-rotor integrated power system is provided, including an underwater propeller that provides double power through a screw pump and a screw propeller, offering a strong integrated action capability. In this way, the drone body has three working modes: water navigation, hovering in the air, and near-ground flight.

Preferably, the plurality of biomimetic unmanned boats is configured to carry out the search and rescue work in the search and rescue region. Specifically, the biomimetic unmanned boat is configured to carry out the search and rescue work in the search and rescue region. When the biomimetic unmanned boat finds a person to be rescued, the biomimetic unmanned boat sends positioning information to the drone, and is converted into an airbag. The drone approaches the biomimetic unmanned boat to carry out rescue.

In a specific embodiment, the drone, or first-level drone, forms a first-level search and rescue network. On the basis of the first-level search and rescue network, the plurality of biomimetic unmanned boats, or second-level plurality of biomimetic unmanned boats, is centered on the drone body to carry out intensive search work. This search and rescue method can ensure real-time control of each search and rescue unit, and ensure comprehensive and efficient search and rescue to cover the search and rescue region in the shortest time.

Embodiment 2

Figure 4:
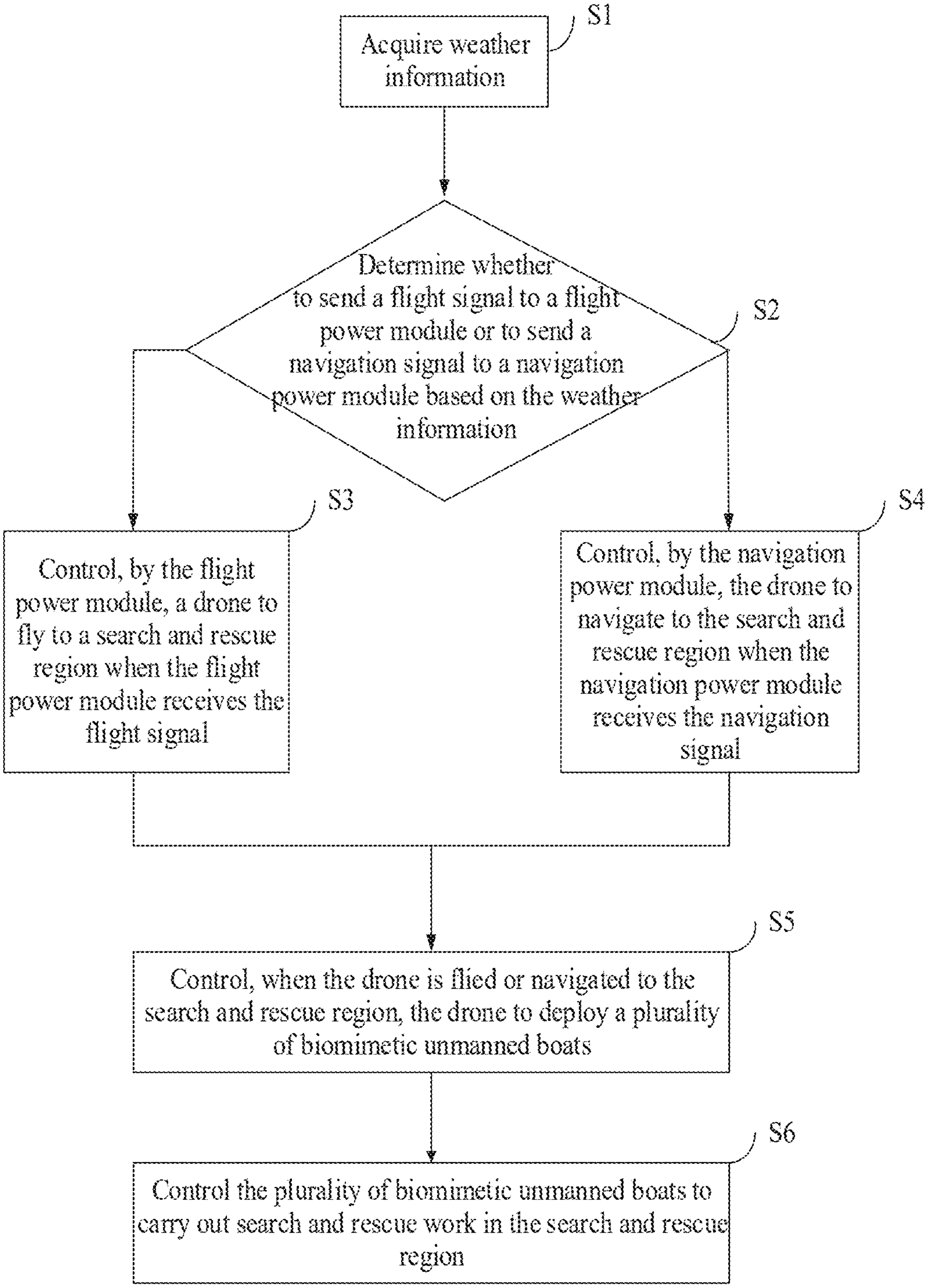
FIG. 4 is a flowchart showing a water-air integrated search and rescue method according to the present disclosure.

The embodiment of the present disclosure provides a water-air integrated search and rescue method. As shown in FIG. 4, the method includes the following steps.

S1. Weather information is acquired. S2. It is determined whether to send a flight signal to a flight power module or to send a navigation signal to a navigation power module based on the weather information. S3. The flight power module, upon receiving the flight signal, controls a drone to fly to a search and rescue region. S4. The navigation power module, upon receiving the navigation signal, controls the drone to navigate to the search and rescue region. S5. When the drone is flied or navigated to the search and rescue region, it controls the drone to deploy a plurality of biomimetic unmanned boats. S6. The plurality of biomimetic unmanned boats carry outs search and rescue work in the search and rescue region.

Preferably, the water-air integrated search and rescue method includes the following steps. If the plurality of biomimetic unmanned boats finds a person to be rescued, the plurality of biomimetic unmanned boats is controlled to send positioning information to the drone, and is converted into an airbag. The drone is controlled to approach the plurality of biomimetic unmanned boats to carry out rescue.

It should be noted that if the biomimetic unmanned boat does not find a person to be rescued, it is automatically retrieved to an accommodation compartment of the drone. A drone body can achieve synchronous information exchange with a main drone of a fleet of a same level, a plurality of biomimetic unmanned boats of a fleet of a lower level, and rescue personnel of a search and rescue center during work.

The drone body is designed as a double-body rectangular compartment (double-door accommodation compartment). The integrated control module is located at a rear of the drone body, allowing the accommodation compartment to carry the biomimetic unmanned boat while increasing buoyancy of the drone body. The biomimetic unmanned boat is a fish-like biomimetic unmanned boat, with a detachable port at a top. It is suitable for various sensing components and can be provided with different functional sensors during different tasks. The biomimetic unmanned boat is provided with a communicatable Forever-12 chip to achieve automatic retrieval. When retrieval is needed, the biomimetic unmanned boat transmits a signal to the drone. Upon receiving the signal, the drone opens the accommodation compartment. When the biomimetic unmanned boat arrives at the accommodation compartment, the drone closes the accommodation compartment to achieve automatic retrieval of the biomimetic unmanned boat.

On the one hand, the information acquired by the plurality of biomimetic unmanned boats can be processed in real time to determine the distribution of personnel and ocean currents in the search and rescue region, and the information can be promptly fed back to the integrated control module. The attitude of the drone can be fine-tuned and the processed key information can be transmitted back to the search and rescue center to assist the rescue personnel in formulating a new plan in a timely manner. On the other hand, the drone body serves as a signal base station, ensuring that the plurality of biomimetic unmanned boats is centered on the signal base station for real-time positioning and coordinate feedback, achieving an inch-by-inch search. Therefore, the drone is flied or navigated, the unmanned boat fleet is configured to carry out the tasks of search, first aid, and feedback, and the rescue personnel arrive at the scene based on the provided coordinates to perform rescue work. In this way, a trinity coordinated search and rescue system is formed.

After the drone reaches the search and rescue region, it is raised to deploy the plurality of biomimetic unmanned boats for search and rescue work. The deployed biomimetic boats are scattered for a net type fleet search. The drone body adjusts a camera to acquire an aerial view. If the biomimetic unmanned boat fails to find a person to be rescued, it will be automatically retrieved into the accommodation compartment. If the biomimetic unmanned boat finds a person to be rescued, it sends positioning information to the drone and is converted into an airbag. The drone approaches to carry out rescue. Finally, the drone communicates with the rescue personnel, and sends acquired search and rescue information to the rescue personnel. The rescue personnel can quickly and accurately arrive at the scene based on the information to carry out efficient sea-air rescue work.

The present disclosure provides a water-air integrated search and rescue system and method. The present disclosure provides a water-air integrated search and rescue system and method. The integrated control module is configured to acquire weather information and determine whether to send a flight signal to the flight power module or to send a navigation signal to the navigation power module based on the weather information. The flight power module is configured to fly the drone to a search and rescue region after receiving the flight signal. The navigation power module is configured to navigate the drone to the search and rescue region after receiving the navigation signal. The integrated control module is further configured to control the drone to deploy the plurality of biomimetic unmanned boats when the drone is flied or navigated to the search and rescue region. The drone is configured to be flied or navigated to the search and rescue region and to deploy the plurality of biomimetic unmanned boats. The plurality of biomimetic unmanned boats is configured to carry out search and rescue work in the search and rescue region. In this way, the present disclosure significantly improves the efficiency of maritime search and rescue.

The technical solution of the present disclosure effectively integrates flight control and the unmanned boat, fully leveraging their respective advantages, and achieving efficient and unmanned sea-air search and rescue. The technical solution of the present disclosure significantly improves the efficiency of maritime search and rescue, reduces the cost of rescue, and maximizes the protection of the personal and property safety of maritime workers.

The technical solution of the present disclosure takes into account the characteristics of marine work and the shortcomings of the original life-saving system, and designs a trinity coordinated search and rescue system. The technical solution of the present disclosure is dedicated to creating a sea-air trinity biomimetic unmanned boat search and rescue system, significantly improving the efficiency of maritime search and rescue, reducing the cost of rescue, and maximizing the protection of the personal and property safety of maritime workers.

The drone body can achieve synchronous information exchange with a main drone of a fleet of a same level, a plurality of biomimetic unmanned boats of a fleet of a lower level, and rescue personnel of a search and rescue center during work. On the one hand, the information acquired by the plurality of biomimetic unmanned boats can be processed in real time to determine the distribution of personnel and ocean currents in the search and rescue region, and the information can be promptly fed back to the integrated control module. The attitude of the drone can be fine-tuned and the processed key information can be transmitted back to the search and rescue center to assist the rescue personnel in formulating a new plan in a timely manner. On the other hand, the drone body serves as a signal base station, ensuring that the plurality of biomimetic unmanned boats is centered on the signal base station for real-time positioning and coordinate feedback, achieving an inch-by-inch search. Therefore, the drone is flied or navigated, the biomimetic unmanned boat fleet is configured to carry out the tasks of search, first aid, and feedback, and the rescue personnel arrive at the scene based on the provided coordinates to perform rescue work. In this way, a trinity coordinated search and rescue system is formed. In this way, the trinity coordinated search and rescue system is formed, which can achieve effective rescue of personnel in distress. With the development of maritime informatization and the increasing diversity of data acquisition equipment, various types of information acquisition equipment on land have begun wireless extension to the sea. The equipment can be combined with the system to achieve reliable detection and positioning, promoting the development of maritime search and rescue work.

The above described are merely preferred specific implementations of the present disclosure, but the protection scope of the present disclosure is not limited thereto. Any modification or replacement easily conceived by those skilled in the art within the technical scope of the present disclosure should fall within the protection scope of the present disclosure.

What is claimed is:

1. A water-air integrated search and rescue system, comprising a flight power module, a navigation power module, a plurality of biomimetic unmanned boats a drone, and an integrated control module, wherein the integrated control module is configured to acquire weather information and determine whether to send a flight signal to the flight power module or to send a navigation signal to the navigation power module based on the weather information; the flight power module is configured to fly the drone to a search and rescue region after receiving the flight signal; the navigation power module is configured to navigate the drone to the search and rescue region after receiving the navigation signal; the integrated control module is further configured to control the drone to deploy the plurality of biomimetic unmanned boats when the drone is flied or navigated to the search and rescue region; the drone is configured to be flied or navigated to the search and rescue region and to deploy the plurality of biomimetic unmanned boats; and the plurality of biomimetic unmanned boats are configured to carry out search and rescue work in the search and rescue region;

the drone includes a drone body; the flight power module and the navigation power module are configured on the drone body; the integrated control module is located at the drone body; the drone is provided with a storage compartment for storing the plurality of biomimetic unmanned boats;

wherein the integrated control module comprises a fleet positioning unit configured to acquire position information of the biomimetic boat module and transmit the position information to a user end;

wherein the fleet positioning unit is specifically configured to generate a short energy pulse sequence, extend the short energy pulse sequence to a frequency range through orthogonal frequency division modulation or direct sorting to acquire an extended short energy pulse sequence, measure a time difference of radio signals arriving at the plurality of biomimetic unmanned boats from different base stations through the extended short energy pulse sequence, and acquire the position information of the plurality of biomimetic unmanned boats; the number of the base stations is three or more;

the integrated control module is specifically configured to control the drone to deploy the plurality of biomimetic unmanned boats at different locations within the search and rescue region when the drone is flied or navigated to the search and rescue region;

wherein each of the plurality of biomimetic unmanned boats is configured to carry out the search and rescue work in the search and rescue region; when any one of the plurality of biomimetic unmanned boats finds a person to be rescued, the one of the plurality of biomimetic unmanned boats sends positioning information to the drone and is converted into an airbag; and the drone approaches the one of the plurality of biomimetic unmanned boats to carry out rescue;

the drone body is designed as an accommodation compartment; the integrated control module is located at a rear of the drone body, allowing the accommodation compartment to carry the biomimetic unmanned boat while increasing buoyancy of the drone body; when the biomimetic unmanned boat arrives at the accommodation compartment, the drone closes the accommodation compartment to achieve automatic retrieval of the biomimetic unmanned boat;

the biomimetic unmanned boat is provided with a camera, sensor, and a main control chip;

the integrated control module further comprises a collision avoidance unit and an alarm unit; the collision avoidance unit include a microcontroller, a serial port, an ultrasonic sensor, a driver transistor, an active buzzer, an crystal oscillator, and a light-emitting diode (LED) power indicator light; the buzzer is provided with the driver transistor.

2. The water-air integrated search and rescue system according to claim 1, wherein the collision avoidance unit is configured to determine a distance between the plurality of biomimetic unmanned boats and an obstacle, and send an alarm signal to the alarm unit if the distance is less than a set threshold; and the alarm unit is configured to alarm upon receiving the alarm signal.

3. The water-air integrated search and rescue system according to claim 2, wherein the collision avoidance unit comprises an ultrasonic sensor and a microcontroller; the collision avoidance unit is specifically configured to emit a high level through a control port of the ultrasonic sensor, start a first timing when there is an output to a receiving port of the ultrasonic sensor, start a second timing when the output to the receiving port of the ultrasonic sensor becomes a low level, acquire a ranging time based on a time difference between the first timing and the second timing, and send the ranging time to the microcontroller; and the microcontroller is configured to calculate the distance, determine whether the distance is less than the set threshold, and send the alarm signal to the alarm unit if the distance is less than the set threshold.

4. The water-air integrated search and rescue system according to claim 1, wherein the integrated control module further comprises an underwater image acquisition unit and a water surface image acquisition unit; and the underwater image acquisition unit and the water surface image acquisition unit are respectively configured to acquire underwater image information and water surface image information.

* * * * *